PICKETT & HILLS.
Corn Husker.
No. 19,512.
Patented March 2, 1858.
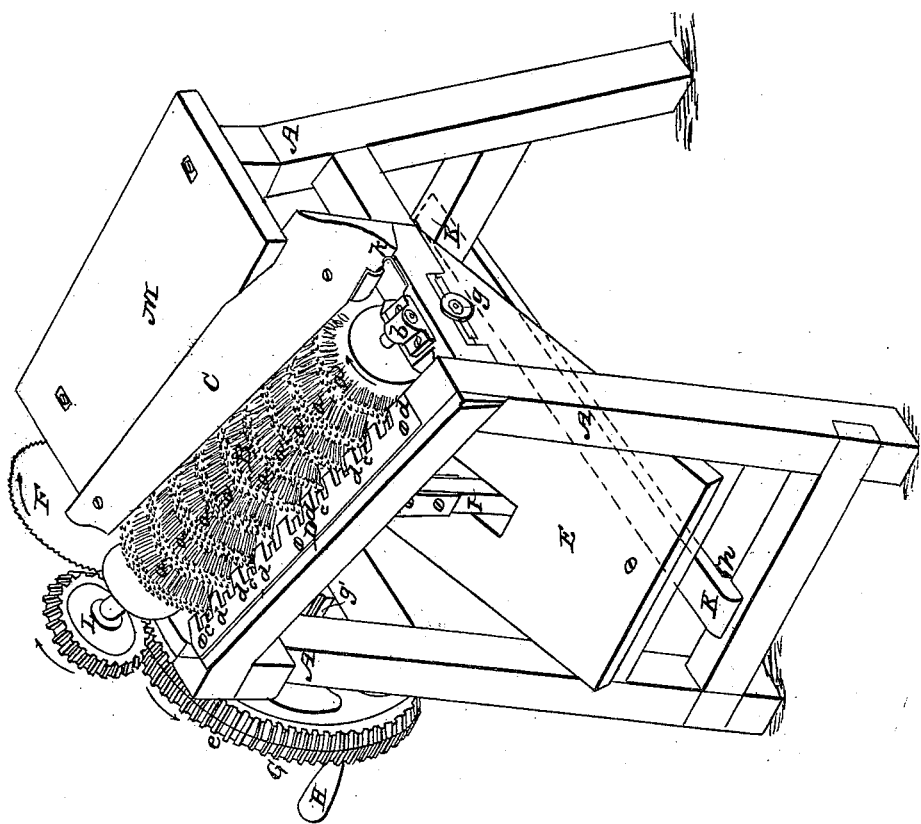

UNITED STATES PATENT OFFICE.

WARNER PICKETT AND ANDREW HILLS, OF NAUGATUCK, CONNECTICUT.

CORN-HUSKER.

Specification of Letters Patent No. 19,512, dated March 2, 1858.

*To all whom it may concern:*

Be it known that we, WARNER PICKETT and ANDREW HILLS, both of the town of Naugatuck, in the county of New Haven and State of Connecticut, have invented a new and useful Improvement in Corn-Husking Machines; and we do hereby declare that the following is a full, clear, and exact description of the construction, character, and operation of the same, reference being had to the accompanying drawing, which makes a part of this specification, which drawing is a perspective view of the whole machine, showing the husking-cylinder, the cleaners, and the curve bar or trough to receive the ears.

Our improvement consists in the use of a husking cylinder set with rings, or sections, of card teeth, or points, and an adjustable curved bar, or trough, for the ears of corn to slide in, so that they will fall against the card teeth on the cylinder; and a series of cleaners, to remove all the husks from the card teeth as the cylinder revolves;—and a circular saw, to cut off the stumps, or shanks, of the ears,—all arranged, substantially, as shown in the drawing, the cylinder, and saw, being connected with gear wheels, or pulleys and bands, and worked by any convenient power.

We make the frame, A, A, A, of wood, or any other suitable material, of any convenient size, and shape.

We make the cylinder, B, of wood, or any other suitable material, of a length, and diameter, suited to the size of the machine, and attach upon its periphery, or convex surface, a series of rings, or sections, of cards or points, as shown at *a*, *a*, &c. (The teeth of these cards must be made of sufficient strength to remove the husk, however closely it may be attached to the ear.)

We set this cylinder at an angle of some 9° to 30° from the horizontal position of the frame, as shown in the drawing, so that the ears of corn will slide down by their gravity when acted on by the teeth of the cylinder. And we have its journals work in suitable bearings, as shown at *b*, in the drawing.

We make the curved bar, or trough, C, of wood, or any other suitable material, of a proper curve, (as shown in the drawing,) to convey the ears directly to the card teeth on the cylinder, and place its lower edge parallel with the cylinder; and we so attach it to the frame, (by binding screws, or otherwise,) that it will be readily adjustable, both vertically, and horizontally, to fit it for the largest ears of southern corn, or the smallest ears of northern corn, so that the same machine may be used throughout the country.

We make the cleaner, *d*, of sheet metal, or any other suitable material, with short projections, C, C, &c., directly opposite the points of the card teeth, and longer projections, *d*, *d*, &c. the ends of which extend between the rings, or sections, of the card teeth, so that the two sets will remove every particle of the husk from the card teeth. This cleaner we also set parallel with the cylinder, B.

We make the circular saw, F, in the usual way, and have the journals of its arbor work in suitable horizontal bearings.

When we work the machine by gear wheels, we make the main, or driving, wheel, G, one part, *e*, of the common spur teeth, and the other part, *f*, of bevel gear teeth, and place it on an arbor which works in suitable horizontal bearings, as shown at *g*, and *g'*. If intended to be worked by the hand, we place a crank pin, H, in the wheel, G, and, if by the foot, we have a crank in the central part of the arbor which we work by a connecting rod, I, and a treadle, K, K, which is hinged to the lower bar of the frame, at *h*. Or, the wheels may be dispensed with, and pulleys and bands used in their stead, in the usual way. And, a fly wheel may be attached, when it is deemed necessary, (as will usually be the case, if bands are used instead of wheels.)

The spur part, *e*, of the wheel, G, works in a pinion (not seen,) on the arbor of the saw, F, and the bevel part, *f*, works in the bevel wheel, L, on the arbor of the cylinder, B.

Having constructed the several parts of our machine, and arranged them, as before described, we put the machine in motion by any convenient power, when the wheels, cylinder, and saw, will all revolve in the directions indicated by the darts. We then, (by hand,) place the ear of corn on the platform, or table, M, in such a position that the butt end of the ear will come against the saw, F, when, by pressing it forward, the saw will cut, or saw, off the stump, or shank, of the ear close to the first row of kernels, so as to liberate all the husks. We then throw the ear into the upper end of the trough, or curved bar, C, when it will fall down against, and remain in contact with, the card teeth on the revolving cylinder, which will strip all the husks from the ear while it is passing down the incline, and the husked ear will fall from the lower end of the trough, C, (as at k,) into any proper receptacle. And as the cylinder, B, revolves the cleanser d, d, &c. and c, c, &c. will remove all the husks from the teeth of the cylinder, and allow them to pass down the inclined plane, C.

The advantages of our improvement consist in the simplicity and cheapness of its construction: its freedom from liability to get out of order, and ease of repairs when necessary; the certainty of its effecting the result; the ease with which it may be worked; and in its being susceptible of being adjusted to suit the largest ears of southern corn, and the smallest ears of northern corn.

We are aware that the cylinder has long been used; and that the circular saw, and the inclined plane, and various forms of curves, are well known in mechanics, and that each have been set at various angles. We, therefore, do not claim either of them, or their angles, as such, as our invention, but,

What we claim as our invention, and desire to secure by Letters Patent, is—

The combination of the inclined cylinder, (B,) with the curved bar, or trough, (C,) and the cleaner, (D,) when the whole is constructed, arranged, and made to produce the result, substantially, in the manner, and by the means, herein set forth.

WARNER PICKETT.
ANDREW HILLS.

Witnesses:
R. FITZGERALD,
ELIZUR HUBLETT.